(12) United States Patent
Wakeman

(10) Patent No.: US 6,554,022 B2
(45) Date of Patent: Apr. 29, 2003

(54) REGULATOR WITH IMPROVED SEAT

(75) Inventor: Robert W. Wakeman, Watertown, SD (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/867,854

(22) Filed: May 30, 2001

(65) Prior Publication Data

US 2002/0179152 A1 Dec. 5, 2002

(51) Int. Cl.$^7$ ........................ F16K 31/365; G05D 16/02
(52) U.S. Cl. ..................... 137/505.42; 251/64
(58) Field of Search ................ 137/505.42, 505; 251/64

(56) References Cited

U.S. PATENT DOCUMENTS

| | | | |
|---|---|---|---|
| 2,597,478 A | * | 5/1952 | Hammon |
| 2,709,065 A | * | 5/1955 | Pohndorf |
| 2,768,643 A | * | 10/1956 | Acomb |
| 3,169,547 A | * | 2/1965 | Pearl |
| 3,586,307 A | * | 6/1971 | Zimmer |
| 4,051,864 A | | 10/1977 | Iwatsuki .................. 136/504 |
| 4,064,905 A | | 12/1977 | Nilsson .................... 137/499 |
| 4,116,213 A | | 9/1978 | Kamezaki ................. 137/360 |
| 4,135,697 A | | 1/1979 | Brumm .................... 251/50 |
| 4,147,177 A | | 4/1979 | Iwatsuki .................. 137/509 |
| 4,176,690 A | | 12/1979 | Clark et al. ............... 137/8 |
| 4,180,093 A | | 12/1979 | Kamezaki ................. 137/360 |
| 4,190,076 A | | 2/1980 | Cameron et al. .......... 137/505.45 |
| 4,471,802 A | * | 9/1984 | Pryor |
| 4,527,594 A | * | 7/1985 | Gafrneau .................. 137/854 |
| 4,531,542 A | | 7/1985 | Looney ..................... 137/514.7 |
| 4,543,985 A | | 10/1985 | Healy et al. .............. 137/505.25 |
| 4,561,465 A | | 12/1985 | Rogers ...................... 137/614.05 |
| 4,679,582 A | * | 7/1987 | Zwicker |
| 4,698,060 A | | 10/1987 | D'Antonio et al. ......... 604/320 |
| 4,710,168 A | * | 12/1987 | Schwab et al. ............. 137/843 |
| 4,958,658 A | | 9/1990 | Zajac ........................ 137/613 |
| 5,033,505 A | | 7/1991 | Eidsmore ................... 137/505.39 |
| 5,062,449 A | | 11/1991 | Woollums et al. ......... 137/505.46 |
| 5,257,646 A | | 11/1993 | Meyer ....................... 137/505.25 |
| 5,303,734 A | | 4/1994 | Eidsmore ................... 137/505.43 |
| 5,345,963 A | | 9/1994 | Dietiker ..................... 137/12 |
| 5,520,215 A | | 5/1996 | Haboush .................... 137/510 |
| 5,586,569 A | | 12/1996 | Hanning et al. ........... 137/116.5 |
| 5,694,975 A | | 12/1997 | Eidsmore ................... 137/489.5 |
| 5,860,447 A | * | 1/1999 | Chu |
| 5,921,261 A | | 7/1999 | Erickson et al. ........... 137/1 |
| 5,941,267 A | | 8/1999 | DeLand et al. ............. 137/15 |
| 6,079,434 A | | 6/2000 | Reid et al. ................. 137/14 |
| 6,173,735 B1 | | 1/2001 | Perry, Jr. et al. .......... 137/489 |

* cited by examiner

Primary Examiner—Stephen M. Hepperle
(74) Attorney, Agent, or Firm—Fletcher, Yoder & Van Someren

(57) ABSTRACT

A pressure regulator having a movable seat and a seat retainer. The seat retainer having a hollow interior with an interior surface. The seat is disposed within the hollow interior of the seat retainer to control fluid flow through the pressure regulator. The seat may be adapted to slidingly engage the interior surface of the seat retainer during movement of the seat to dampen the movement of the seat. The seat may be elastically deformed by the seating surface when seated against the seating surface. The pressure regulator may have a stem extending through the seat retainer orifice and affixed to the solid body of the seat to move the seat in response to movement of a diaphragm.

29 Claims, 5 Drawing Sheets

REGULATOR WITH IMPROVED SEAT

FIELD OF THE INVENTION

The present invention relates generally to a pressure regulator, and particularly to a pressure regulator having an improved seat and seating assembly for controlling fluid flow through the pressure regulator.

BACKGROUND OF THE INVENTION

Pressure regulators are used in fluid systems to regulate the flow of fluid through the pressure regulator, and thereby to maintain a desired downstream fluid pressure. Typically, a pressure regulator is used to reduce the pressure of a fluid from a higher pressure to a lower pressure. For example, some fluid systems utilize gas stored in a cylinder as a source of gas for various needs, such as fuel for a gas welding system. However, the gas must be stored at a high pressure so that as much gas as possible can be stored within the limited volume of the cylinder. In the example of a gas welding system, the system components that receive the gas typically do not operate at the pressure of the gas in the cylinder. Therefore, a pressure regulator is typically used to reduce the pressure of the gas supplied by the cylinder down to a lower gas pressure that is more conducive for use with the welding system.

Typically, a pressure regulator has an inlet, an outlet and a valve to control the flow of fluid from the inlet to the outlet. The regulator senses the pressure downstream and opens the valve to allow additional fluid to flow through the regulator to raise the pressure downstream. The pressure regulator closes the valve once the desired downstream pressure has been achieved. A typical valve for a pressure regulator has a valve seat and a seating surface surrounding an orifice. When downstream pressure is lower than desired, the valve directs the seat away from the seating surface to allow fluid to flow through the orifice to raise the pressure of the fluid downstream. When the desired downstream pressure is achieved, the valve urges the seat against the seating surface to prevent more fluid from flowing through the orifice.

In a typical pressure regulator, several forces act on the seat. A biasing spring is typically used to maintain the seat against the seating surface when no other forces are acting on the seat, or when the sum of the other forces acting on the seat is zero. A regulating spring is typically used to establish the desired downstream pressure. The force of the regulating spring is coupled to the seat through a diaphragm. The diaphragm is flexible and couples the pressure of the fluid downstream of the seat to the regulating spring. When the force produced by the pressure of the fluid acting on the diaphragm is greater than the force applied by the regulating spring, the diaphragm is positioned so that the seat is seated against the seating surface. When the force produced by the pressure of the fluid acting on the diaphragm is less than the force applied by the regulating spring, the diaphragm is positioned so that the seat is unseated from the seating surface, allowing fluid to flow downstream and raising the pressure downstream. Eventually, the rise in pressure downstream will be sufficient to overcome the regulating spring force and close the seat, thereby establishing the downstream pressure. By varying the force applied to the diaphragm by the regulating spring, the downstream pressure can be adjusted. A threaded mechanism is typically used to vary the force applied by the spring on the diaphragm by compressing or uncompressing the regulating spring.

In operation, the seat may be seated and unseated rapidly and with great frequency. The repeated seating and unseating of the seat may damage the seat and even produce an audible humming sound. Consequently, devices are commonly used to dampen the movement of the seat. These devices are typically placed between the seat and a fixed surface to produce friction. However, these dampening devices add to the complexity of assembling and operating the pressure regulator.

Additionally, the seat is typically ring-shaped and composed of a material, such as rubber or tetraflourethylene, which has poor memory characteristics. These materials are plastically deformed when seated against the seating surface. While this enables a good seal to be made between the seat and the seating surface, because of the plastic deformation, the seats do not return to their original shape when unseated. Particles can collect in these seats and are retained in the material due to the plastic deformation of the materials. These particles reduce the ability of the seat to form a seal.

The typical valve stem extends through the center of the ring-shaped seat. The typical valve stem also has a conical portion that serves to support and guide the seat, and that serves as part of the seat for sealing purposes. Consequently, the valve stem is usually composed of a metal that must be electro-polished, adding significant expense to the cost of the valve stem.

There exists a need for a pressure regulator valve assembly that solves some or all of the problems outlined above. Specifically, there is a need for a seat that is operable to dampen its own movement without the need for extra parts, such as friction dampers. Additionally, there is a need for a seat that is elastically deformed when seated, rather than plastically deformed. Furthermore, there is a need for a pressure regulator that does not require metal components, such as valve stems, to be electro-polished.

SUMMARY OF THE INVENTION

The present technique provides a novel regulator designed to respond to such needs. According to one aspect of the present technique, a pressure regulator comprises a seat and a seat retainer. The seat and seat retainer control fluid flow through the pressure regulator. The seat retainer has a hollow interior with an interior surface. The seat is movable and is disposed within the hollow interior of the seat retainer. The seat is adapted such that it slidingly engages the interior surface of the seat retainer during movement of the seat. The sliding engagement dampens the movement of the seat.

According to another aspect of the present technique, a pressure regulator is provided that comprises a seat and a seating surface. The seat is seated against the seating surface to prevent fluid from flowing through the pressure regulator. The seat is elastically deformed by the seating surface when it is seated against the seating surface.

According to yet another aspect of the technique, a pressure regulator is featured that comprises a seat, a seat retainer, a diaphragm, and a stem. The seat retainer has an orifice that enables fluid to flow through the seat retainer. The seat has a solid body and is disposed within the seat retainer. Additionally, the seat is movable relative to the seat retainer. In a first position of the seat, the seat is disposed against the seating surface so that fluid flow through the orifice is blocked. In a second position of the seat, there is a path for fluid to flow through the orifice. Furthermore, the stem extends through the orifice and is affixed to the seat. The stem is operable to move the seat in response to movement of the diaphragm.

BRIEF DESCRIPTION OF THE DRAWINGS

The invention will hereafter be described with reference to the accompanying drawings, wherein like reference numerals denote like elements, and.

DETAILED DESCRIPTION OF THE PREFERRED EMBODIMENTS

Figure 1:
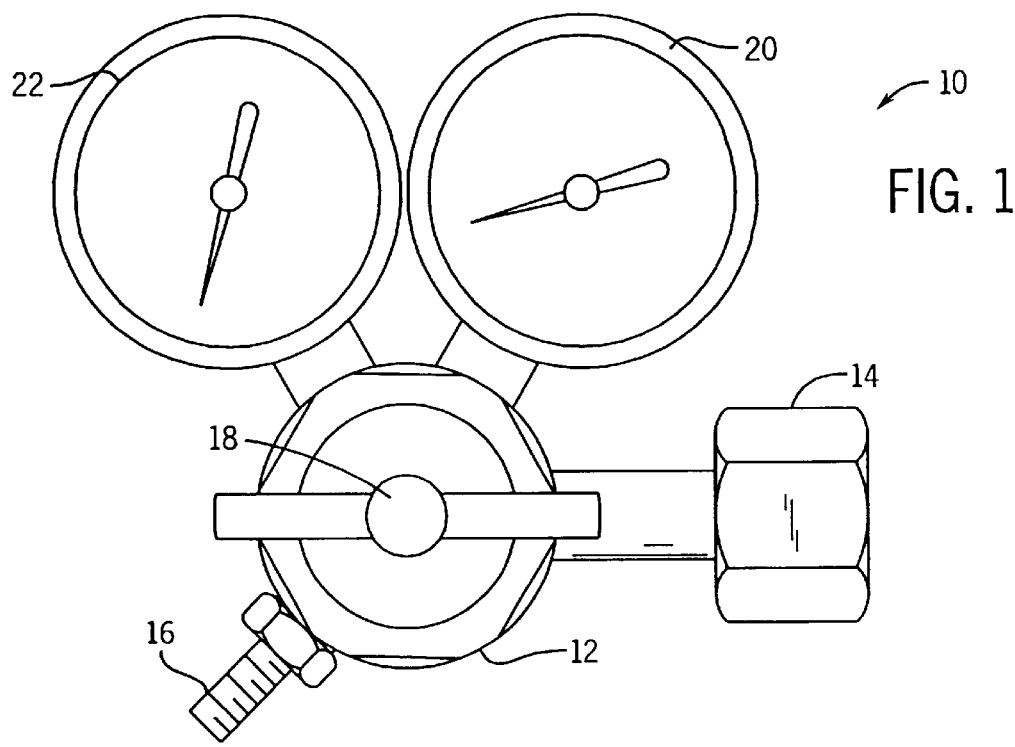
FIG. 1 is a perspective view of a pressure regulator, according to an exemplary embodiment of the present technique.

Referring generally to FIG. 1, an exemplary pressure regulator 10 is illustrated. The pressure regulator 10 has a central housing 12 that houses the internal components of the pressure regulator 10. The central housing 12 has a fluid inlet 14 and a fluid outlet 16. Fluid enters the regulator 10 through the inlet 14 and exits through the outlet 16. An adjusting screw 18 is used to operate the pressure regulating portions of the pressure regulator 10 to establish the downstream pressure. An upstream pressure gauge 20 is used to indicate the pressure of the fluid entering the pressure regulator 10. A downstream pressure gauge 22 is used to indicate the pressure of fluid downstream of the pressure regulator 10. The pressure regulator 10 also may have a relief valve (not shown). The relief valve is set to relieve pressure if the pressure within the pressure regulator exceeds a pre-set amount. This protects the regulator from damage due to over-pressurization.

Figure 2:
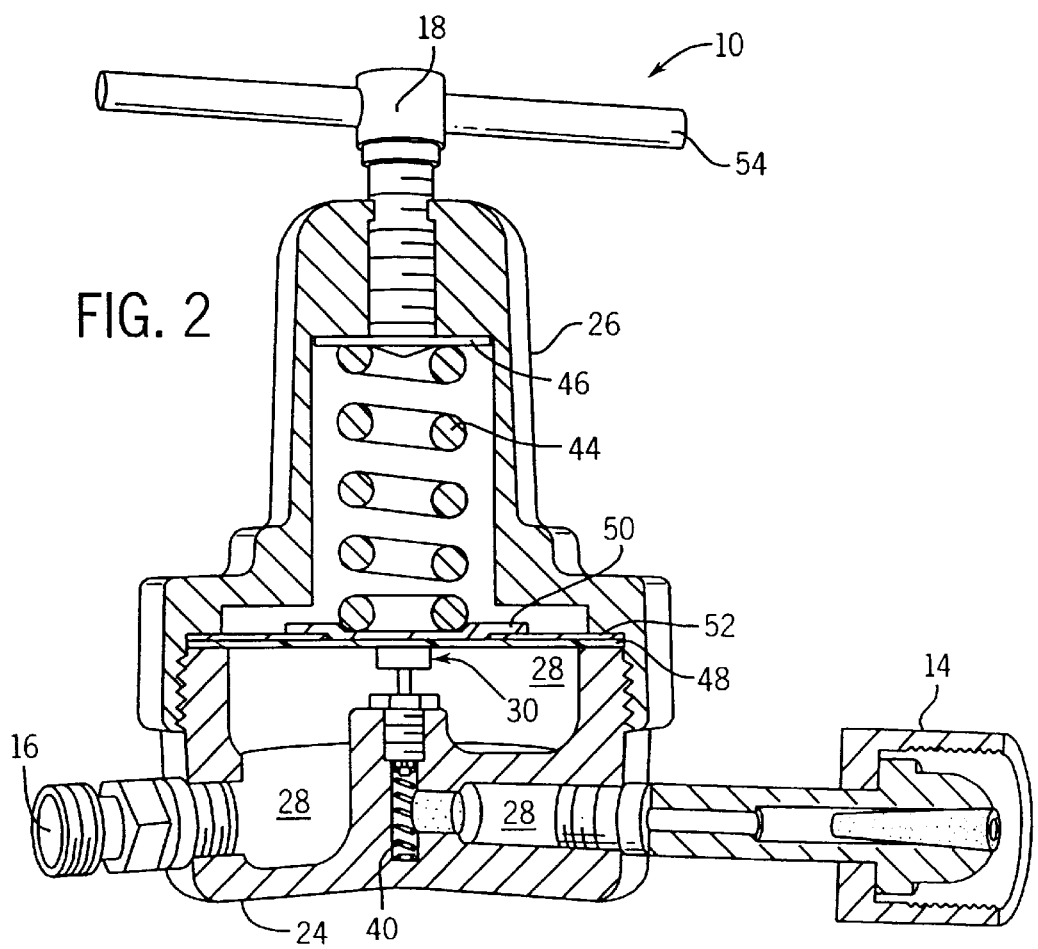
FIG. 2 is a cross-sectional view of a pressure regulator, according to an exemplary embodiment of the present invention.
Figure 3:
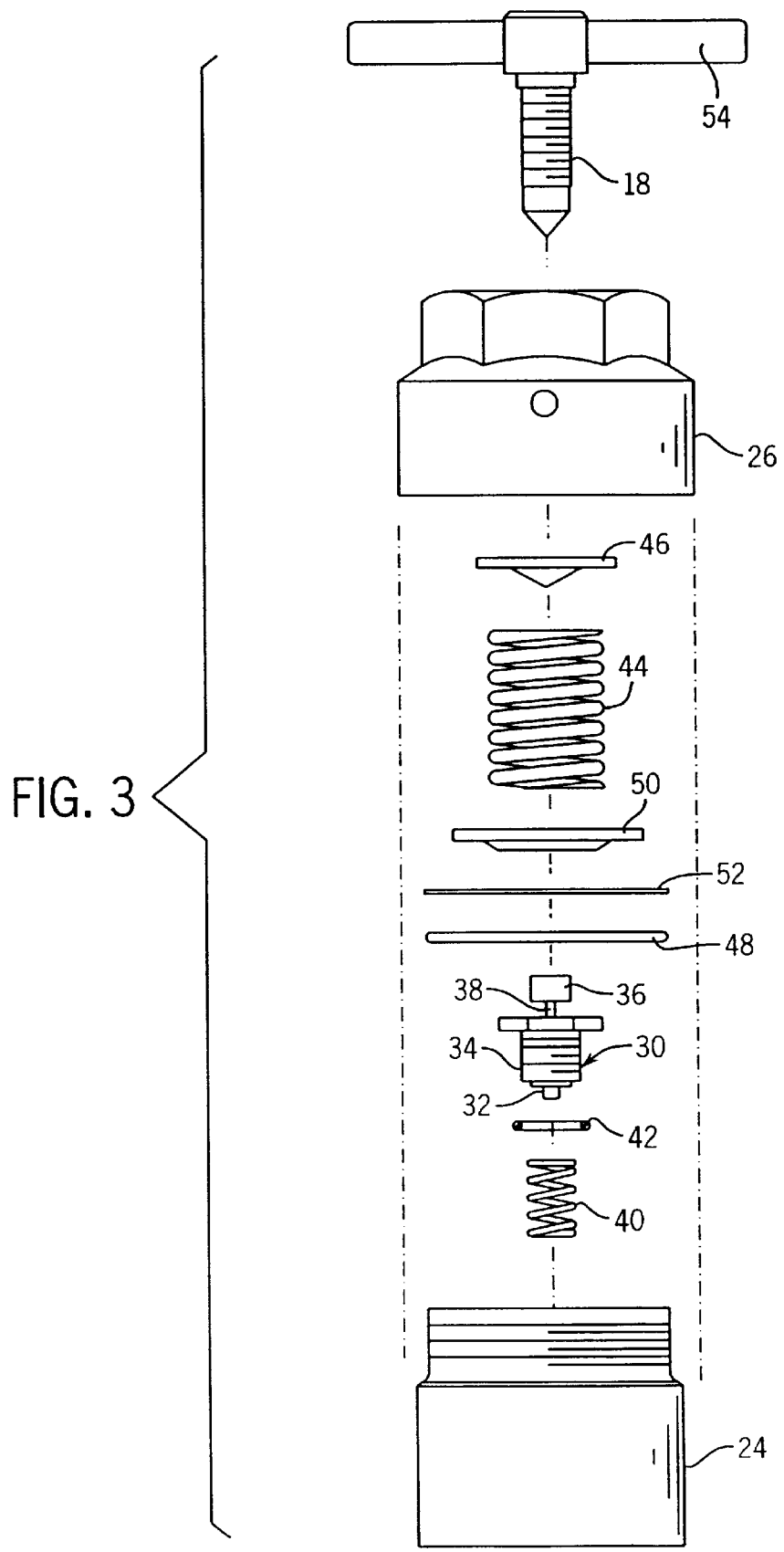
FIG. 3 is an exploded view of the components of the central housing of FIG. 1.
Figure 4:
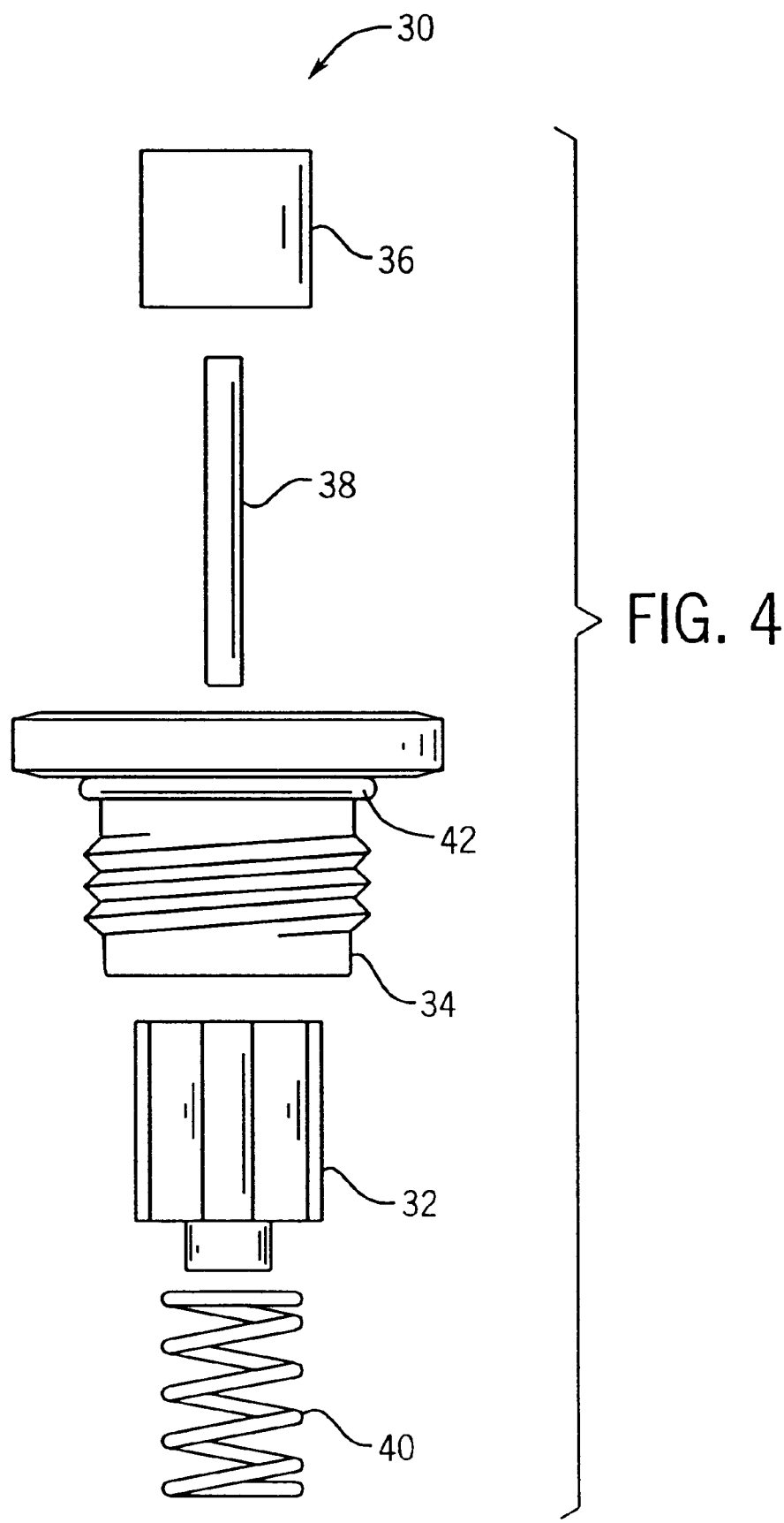
FIG. 4 is an exploded view of the components of the seat assembly shown in FIG. 3.

Referring generally to FIGS. 2, 3 and 4, the illustrated central housing 12 has a body 24 and a bonnet 26. The bonnet 26 is threaded onto the body 24 to form a protective shell for the internal components of the pressure regulator 10. The body 24 is formed to create an internal fluid flow path 28 through the pressure regulator 10. The body 24 also has threaded openings to enable the pressure gauges to be secured to the pressure regulator and to be in fluid communication with the upstream and downstream fluid pressures. A seat assembly 30 is disposed in the internal fluid flow path 28 to control fluid flow from the inlet 14 to the outlet 16.

The seat assembly 30 has a movable seat 32 that is housed within a hollow seat retainer 34 (see, e.g., FIGS. 3 and 4). In an open position of the seat 32, the seat 32 is positioned relative to the seat retainer 34 such that fluid is able to flow through the seat retainer 34 around the seat 32. In the closed position of the seat 32, seat 32 is positioned relative to the seat retainer 34 so that the seat 32 blocks flow through the seat retainer 34. The seat 32 is coupled to a stem support 36 by a stem 38 that extends to the seat 32 through the seat retainer 34. A biasing spring 40 biases the seat 32 into the seated position. An O-ring 42 is used to form a seal between the seat retainer 34 and the body 24 to prevent any fluid from bypassing the seat assembly 30.

The adjusting screw 18 and an adjusting spring 44 produce a force that is coupled to the seat 32 to maintain a desired downstream pressure. In the illustrated embodiment, the adjusting screw 18 is coupled to one end of the adjusting spring 44 by a spring button 46. The other end of the adjusting spring 44 is coupled to a diaphragm 48 by a backup plate 50. The diaphragm 48 is comprised of a flexible material and forms a fluid seal within the central housing 12. A diaphragm 52 is used to protect the diaphragm 48 from damage when installing the bonnet 26 to the body 24. The pressure of fluid downstream of the seat assembly 30 produces a force that urges the diaphragm 48 against the backup plate 50 and adjusting spring 44. In the illustrated embodiment, the adjusting screw 18 is positioned by rotating a handle 54 coupled to the adjusting screw 18. To raise the downstream pressure to a higher desired pressure, the adjusting screw 18 is threaded into the bonnet 26, which forces the adjusting spring 44 against the diaphragm 48. This action compresses the adjusting spring 44 and increases the force that must be provided by the fluid pressure downstream to overcome the force of the adjusting spring 44 to close the seat 32 against the seat retainer 34. To lower the downstream pressure, the adjusting screw is threaded out of the bonnet 26, which reduces the force of the adjusting spring 44 against the diaphragm 48.

When downstream pressure is lower than the desired pressure set by the adjusting spring, the diaphragm 48 will flex downward, in the views of FIGS. 2 and 3. The downward movement of the diaphragm 48 is coupled by the stem support 36 and the stem 38 to the seat 32. The downward movement of the seat 32 compresses the biasing spring 40 and positions the seat 32 to allow more fluid to flow downstream, thereby raising the pressure downstream. Eventually, the downstream pressure should rise to the new desired pressure and the diaphragm will overcome the force of the adjusting spring 44 and flex upwardly, in the view of FIGS. 2 and 3. The biasing spring 40 drives the seat 32, stem support 36, and stem 38 upwardly. The upward movement urges the seat 32 against the seat retainer 34, stopping additional fluid flow. The upward movement also maintains the stem support 36 against the diaphragm 48. A similar process takes place if the adjusting screw 18 is rotated outward from the bonnet 26. The force applied by the adjusting spring 44 is thereby lowered. As the pressure downstream drops, the seat 32 will open to raise the pressure. However, the downstream pressure needed to overcome the spring 40 and position the seat 32 in the closed position is lessened, thereby maintaining downstream pressure at a lower pressure.

Figure 5:
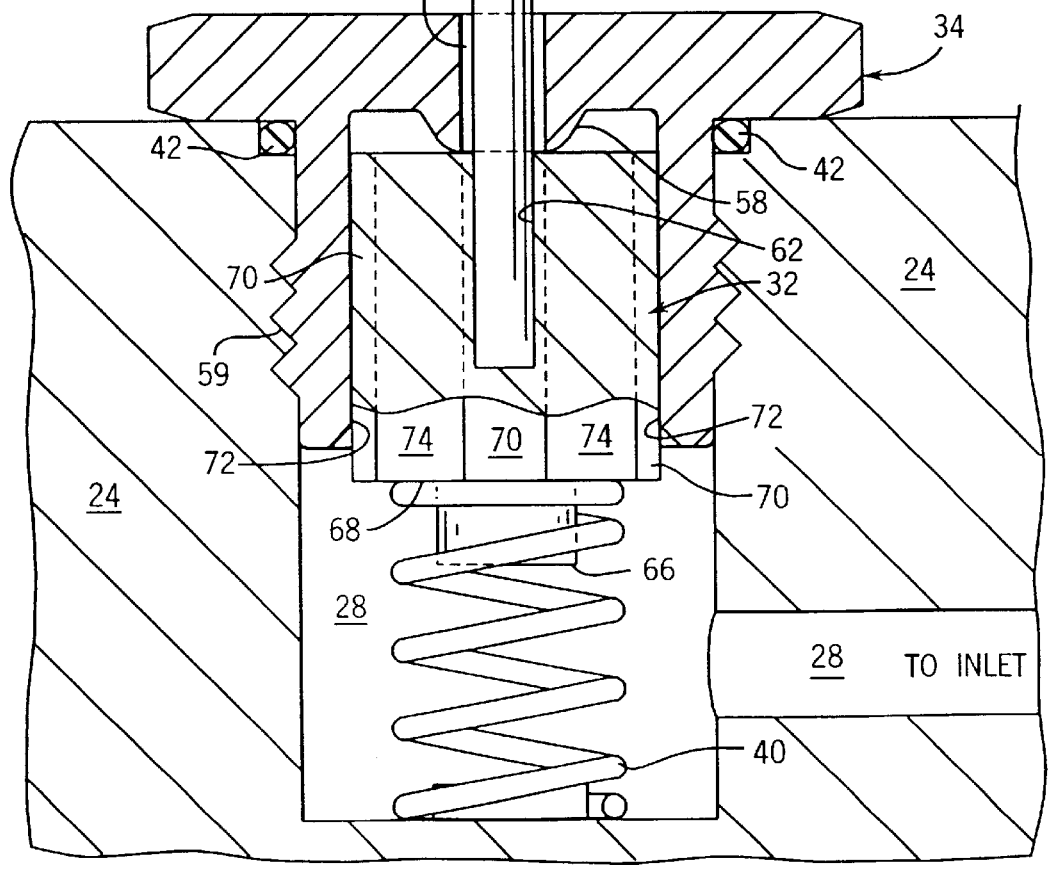
FIG. 5 is a cross-sectional view of a seat assembly illustrating a seat positioned in a seated position, according to an exemplary embodiment of the present technique.

Referring generally to FIG. 5, the seat retainer 34 has an orifice 56 to enable fluid to flow out of the seat retainer 34. A portion of the seat retainer surrounding the orifice 56 is configured to form a seating surface 58 for the seat 32. The seat retainer 34 also has threads 59 for threading the seat retainer 34 into the body 24. The closed position of the seat 32 is obtained by positioning the seat 32 against the seating surface 58, preventing fluid flow through the orifice 56. In FIG. 5, the seat 32 is illustrated seated against the seating surface 58. The seat 32 is seated against the seating surface 58 when the force of the fluid pressure and/or the biasing spring 40 is greater than the force of the adjusting spring 44 (see, e.g., FIG. 2).

Figure 6:
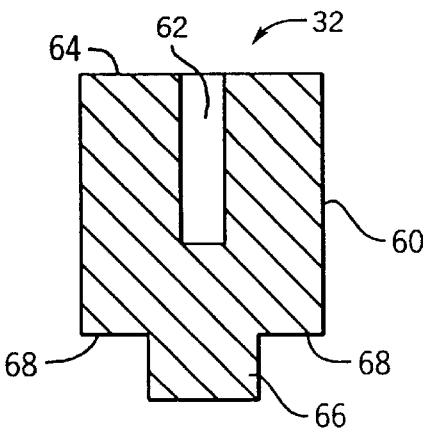
FIG. 6 is a cross-sectional view of a seat, according to an exemplary embodiment of the present technique.

As best illustrated in FIG. 6, the seat 32 is a single-piece molded component having a rigid solid body 60. A recess 62 extends partially through the solid body 60. The stem 38 (see FIG. 5) terminates in the recess 62. The stem 38 and recess 62 are configured so that the stem 38 is secured to the seat 32 when the stem 38 is driven into the recess 62. The surface 64 of the seat 32 having the recess 62 forms the sealing surface of the seat 32 for engagement with the seating surface 58 of the seat retainer 34. In the exemplary embodiment illustrated, the stem 38 is not used to form a sealing surface of the seat 32. Thus, the stem 38 need not be electro-polished because the stem 38 is not a sealing surface. Rather, the stem 38 may be constructed of any suitable material, such as bare metal, and is made of rolled steel in one embodiment. The seat 32 also has a cylindrical skirt portion 66 extending from a flat bottom portion 68. The skirt portion 66 and flat bottom portion 68 are configured so that the biasing spring 40 is positioned securely against the seat 32 to bias the seat against the seating surface 58 of the seat retainer 34.

Figure 7:
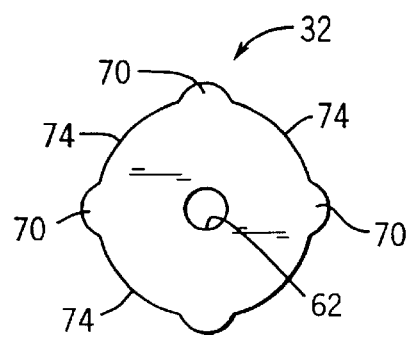
FIG. 7 is an end-view of the seat of FIG. 6.

As best illustrated in FIG. 7, the seat 32 has a plurality of lobes 70 extending along its exterior to form the flow channels 74. Referring again to FIG. 5, the seat 32 and seat retainer 34 are configured so that the seat 32 and seat retainer have an interference fit. The interference fit is achieved via the sliding engagement of the lobes 70 against the interior surface 72 of the seat retainer. In operation, the seat 32 may be unseated and seated repeatedly with great frequency. The friction produced between the lobes 70 and the interior surface 72 of the seat retainer 34 will dampen the movement of the seat 32 and minimize or prevent audible humming produced by cyclic movement of the seat 32, as well as lengthening the life of the seat 32. Additionally, the plurality of lobes 70 define the plurality of flow channels 74 between the body 60 of the seat 32 and the interior surface 72 of the seat retainer 34.

Referring generally to FIGS. 6 and 7, the exemplary seat 32 is comprised of a material having good memory properties, such as polyethylene or polypropylene. The material composition of the seat 32 enables the seat 32 to be elastically deformed when seated against the seating surface 58, rather than plastically deformed, as in heretofore known regulators. When the seat 32 is unseated from the seating surface 58, the seat 32 will return to its original shape, or approximately so, causing any particles that may have been trapped by the seat 32 when seated against the seating surface 58 to be ejected from the seat 32.

Figure 8:
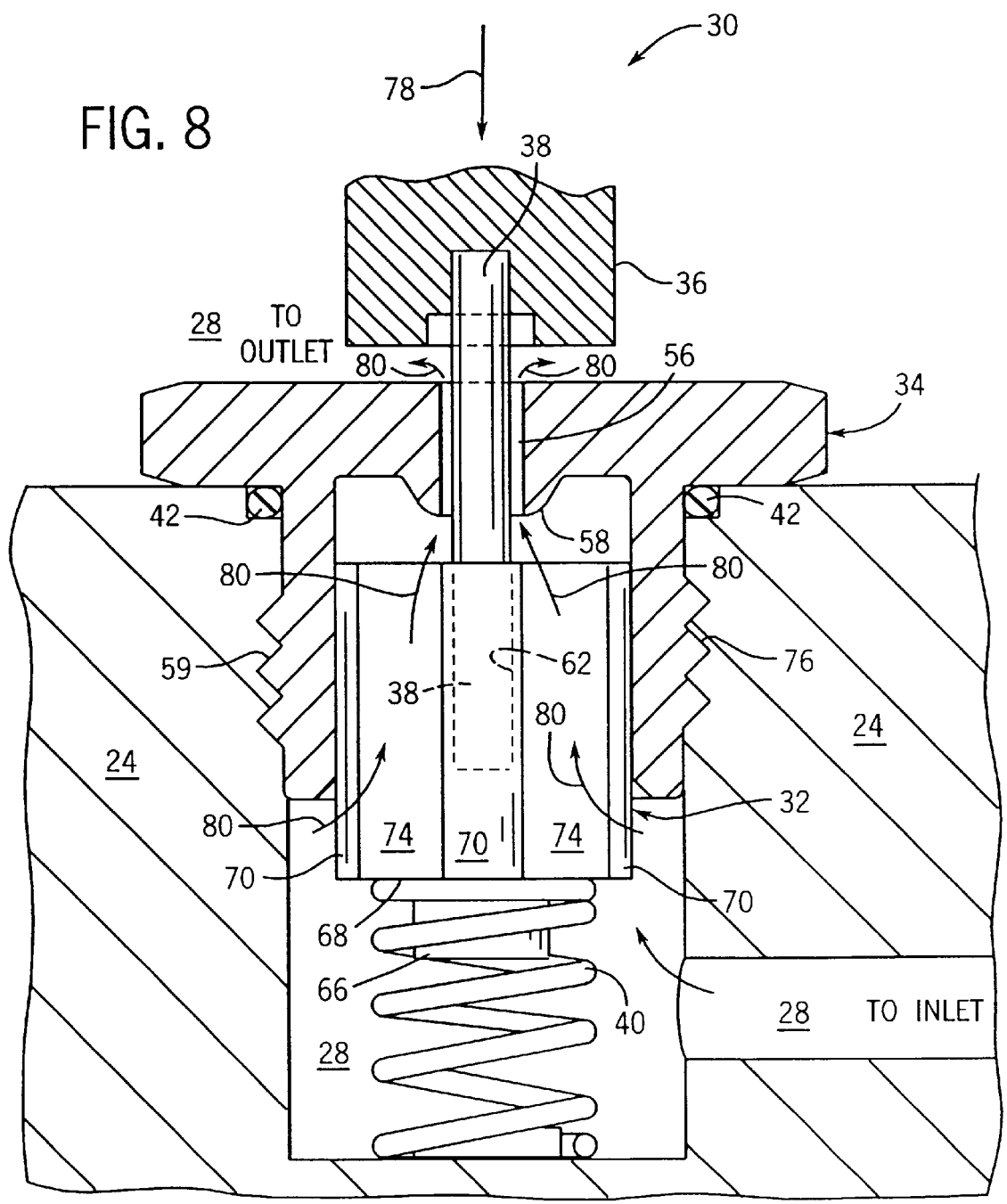
FIG. 8 is a cross-sectional view of a seat assembly illustrating the seat positioned in an unseated position, according to an exemplary embodiment of the present technique.

Referring generally to FIG. 8, the seat 32 follows the movement of the diaphragm, as represented by the arrow 78. The seat 32 is unseated from the seating surface 58 by the stem 38 when the force of the adjusting spring 44 (see, e.g., FIG. 2) is greater than the force produced by the pressure of the downstream fluid and the biasing spring 40. Fluid, as represented by arrows 80, flows through the seat assembly 30 via the flow channels 74 and through the orifice 56 around the stem 38. The fluid 80 continues through the pressure regulator 10 via the internal passageway 28 to the outlet 16. From the outlet 16, fluid 80 flows on to downstream components of the fluid system in which the regulator is installed.

Referring again to FIG. 5, the increase in fluid flowing through the orifice will cause the pressure downstream to rise. A rise in the downstream fluid pressure will oppose the force of the adjusting spring 44 across the diaphragm 48 (see, e.g., FIG. 2). If the system is operating properly, the force produced by the fluid pressure will eventually overcome the force produced by the adjusting spring 44 and flex the diaphragm 48 upwardly, in the view of FIG. 5, as represented by the arrow 82. The seat 32 follows the movement of the diaphragm 48. Ultimately, the seat 32 will be reseated against the seating surface 58.

It will be understood that the foregoing description is of preferred exemplary embodiments of this invention, and that the invention is not limited to the specific forms shown. For example, the regulator may be a dual-regulator system. Additionally, the regulator may be used with gas welding systems, compressed air systems, or any other suitable system utilizing a pressure regulator. Furthermore, the regulator may be configured to control pressure over a variety of pressure ranges. These and other modifications may be made in the design and arrangement of the elements without departing from the scope of the invention as expressed in the appended claims.

What is claimed is:

1. A pressure regulator, comprising:
   a fixed, hollow, seat retainer; and
   a movable seat disposed within the hollow seat retainer to control fluid flow through the pressure regulator, the seat having a plurality of outwardly projecting polymeric portions adapted to slidingly engage an interior surface of the hollow seat retainer to define a fluid passageway between the seat and an interior surface of the hallow seat retainer and to produce friction between the seat and the interior surface of the seat retainer to dampen movement of the seat;
   wherein fluid is free to flow through the pressure regulator via the fluid passageway to raise fluid pressure downstream of the pressure regulator in a first position of the seat, further wherein fluid is blocked from flowing downstream via the fluid passageway in a second position of the seat.

2. The pressure regulator as recited in claim 1, wherein a first end of the seat retainer comprises a seating surface surrounding an orifice, and wherein fluid is blocked from exiting the seat retainer through the orifice when the seat is positioned against the seating surface.

3. The pressure regulator as recited in claim 2, wherein the seat is elastically deformed when positioned against the seating surface to block fluid flow through the orifice.

4. The pressure regulator as recited in claim 3, wherein the seat comprises polyethylene.

5. The pressure regulator as recited in claim 2, further comprising a diaphragm and a stem, wherein the seat has a solid body, further wherein the stem extends through the orifice and terminates in a recess in the solid body, the stem being operable to move the seat in response to movement of the diaphragm.

6. The pressure regulator as recited in claim 5, wherein the stem comprises a rolled pin.

7. The pressure regulator as recited in claim 1, wherein the portions of the seat comprise a plurality of lobes extending outward from a body portion of the seat.

8. The pressure regulator as recited in claim 7, wherein fluid flows through the orifice via a fluid flow path defined by the interior surface of the seat retainer, the plurality of lobes, and an exterior surface of the body portion of the seat.

9. A pressure regulator, comprising:
   a seating surface; and
   a movable seat disposed within a housing, the seat having a first portion adapted to slidingly engage the housing and a second portion adapted to seat against the seating surface, the seat consisting essentially of a polymeric material, wherein the seat is seated against the seating surface to prevent fluid from flowing trough the pressure regulator.

10. The pressure regulator as recited in claim 9, wherein the seat returns to its original shape when unseated from the seating surface.

11. The pressure regulator as recited in claim 9, wherein the seat expels particulate embedded in the seat when unseated from the seating surface.

12. The pressure regulator as recited in claim 9, wherein the seat is nested within the housing during movement of the seat to dampen the movement of the seat.

13. The pressure regulator as recited in claim 9, wherein the seat comprises polyethylene.

14. The pressure regulator as recited in claim 9, further comprising a flexible diaphragm, a stem coupled to the diaphragm, and a biasing spring coupled to the seat, wherein the stem terminates in a recess in the seat, further wherein the diaphragm, stem, and biasing spring cooperate to position the seat in response to downstream pressure.

15. The pressure regulator as recited in claim 14, wherein the stem comprises a rolled pin.

16. A pressure regulator, comprising:
    a seat retainer having an orifice to enable fluid to flow through the seat retainer;
    a one-piece seat disposed within the seat retainer, the seat having a seating surface adapted for sealing engagement with the seat retainer and an outer surface adapted for sliding engagement with the seat retainer.

17. The pressure regulator as recited in claim 16, wherein the seat is adapted to engage an interior surface of the seat retainer to produce friction during movement of the seat to dampen the movement of the seat.

18. The pressure regulator as recited in claim 16, wherein the seat retainer comprises a seating surface surrounding the orifice, wherein the seat is elastically deformed when seated against the seating surface in the first position.

19. The pressure regulator as recited in claim 16, comprising a stem extending through the orifice and affixed to the seat, the stem being operable to move the seat in response to movement of the diaphragm, wherein the stem comprises a bare metal pin.

20. The pressure regulator as recited in claim 19, wherein the stem is a rolled pin.

21. The pressure regulator as recited in claim 1, wherein the seat comprises a plurality of protrusion portions extending axially along the seat, wherein the plurality of protrusions are operable to slidingly engage an interior surface of the seat retainer.

22. A pressure regulator, comprising:
    a fixed, hollow, seat retainer; and
    a movable polymeric seat nested within the hollow seat retainer to control fluid flow through the pressure regulator, the seat being interference fit with the seat retainer to dampen movement of the seat.

23. The pressure regulator as recited in claim 22, wherein the seat comprises a plurality of outwardly projecting portions adapted to produce friction between the seat and the interior surface of the seat retainer.

24. The pressure regulator as recited in claim 22, wherein the seat is elastically deformed when positioned against a seating surface to block fluid flow through the orifice.

25. The pressure regulator as recited in claim 22, further comprising a diaphragm and a stem, wherein the seat has a solid body, further wherein the stem extends through the orifice and terminates in a recess in the solid body, the stem being operable to move the seat in response to movement of the diaphragm.

26. The pressure regulator as recited in claim 22, wherein the projecting portions of the seat comprise a plurality of lobes.

27. The pressure regulator as recited in claim 26, wherein fluid flows through the orifice via a fluid flow path defined by the plurality of lobes.

28. A pressure regulator, comprising:
    a housing having a sealing surface; and
    a movable member disposed within the housing to control fluid flow through the housing, the movable member comprising:
        a plurality of first portions, each first portion being adapted to slidingly engage the housing as the movable member is moved relative to the housing; and
        a second portion adapted for sealing engagement with the sealing surface, the plurality of first portions and the second portion comprising a polymeric material.

29. A pressure regulator, comprising:
    a first housing having an opening therethrough; and
    a single-piece polymeric member movably disposed within the housing to control fluid flow through the opening, the single-piece member comprising:
        a first portion adapted to slidingly engage a surface of the housing as the single-piece member is moved relative to the housing; and
        a second portion adapted for sealing engagement around the opening.

* * * * *